United States Patent
Muto et al.

(10) Patent No.: US 10,330,192 B2
(45) Date of Patent: Jun. 25, 2019

(54) AUTOMATIC TRANSMISSION, CONTROL METHOD OF AUTOMATIC TRANSMISSION, VEHICLE AND CONTROL METHOD OF VEHICLE

(71) Applicant: HONDA MOTOR CO., LTD., Tokyo (JP)

(72) Inventors: Akio Muto, Wako (JP); Shohei Taka, Wako (JP); Mitsuhiro Araki, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 285 days.

(21) Appl. No.: 15/443,253

(22) Filed: Feb. 27, 2017

(65) Prior Publication Data
US 2017/0248226 A1    Aug. 31, 2017

(30) Foreign Application Priority Data
Feb. 29, 2016  (JP) ................. 2016-037931

(51) Int. Cl.
| | |
|---|---|
| B60W 50/02 | (2012.01) |
| F16H 61/12 | (2010.01) |
| F16H 3/10 | (2006.01) |
| F16H 61/00 | (2006.01) |
| F16H 3/00 | (2006.01) |
| F16H 61/688 | (2006.01) |
| F16H 63/42 | (2006.01) |
| F16H 61/20 | (2006.01) |

(52) U.S. Cl.
CPC ......... *F16H 61/12* (2013.01); *B60W 50/0205* (2013.01); *F16H 3/10* (2013.01); *F16H 61/0059* (2013.01); *F16H 3/006* (2013.01); *F16H 61/688* (2013.01); *F16H 2061/1204* (2013.01); *F16H 2061/205* (2013.01); *F16H 2063/426* (2013.01); *F16H 2200/0065* (2013.01); *F16H 2312/04* (2013.01)

(58) Field of Classification Search
None
See application file for complete search history.

(56) References Cited

U.S. PATENT DOCUMENTS

| | | | |
|---|---|---|---|
| 6,349,246 B1 | 2/2002 | Smith et al. | |
| 6,463,373 B2 | 10/2002 | Suganuma et al. | |
| 9,470,292 B2 * | 10/2016 | Andreasen | .............. F16H 3/006 |

(Continued)

FOREIGN PATENT DOCUMENTS

| | | |
|---|---|---|
| JP | 2002-221075 A | 8/2002 |
| JP | 5081215 B2 | 9/2012 |
| WO | 2014/097934 A1 | 6/2014 |

OTHER PUBLICATIONS

Office Action dated Jan. 4, 2018, in Japanese Patent Application No. 2016-037931.

(Continued)

*Primary Examiner* — Justin Holmes
(74) *Attorney, Agent, or Firm* — Thomas| Horstemeyer, LLP

(57) ABSTRACT

A vehicle makes a notification to prompt a driver to perform a predetermined operation in a case in which a predetermined function of the vehicle is lost, and starts a recovery operation of the function on condition that the predetermined operation is performed.

8 Claims, 10 Drawing Sheets

(56) References Cited

U.S. PATENT DOCUMENTS

| | | | | |
|---|---|---|---|---|
| 2009/0186742 A1* | 7/2009 | Dreher | ............ | F16H 61/12 |
| | | | | 477/78 |
| 2010/0042302 A1* | 2/2010 | Fritzer | ............ | F16H 61/12 |
| | | | | 701/62 |
| 2010/0099536 A1* | 4/2010 | Vennemann | ......... | F16H 61/12 |
| | | | | 477/77 |
| 2013/0261912 A1* | 10/2013 | Arai | ............ | F16H 61/061 |
| | | | | 701/60 |
| 2015/0314727 A1 | 11/2015 | Marunaka et al. | | |
| 2018/0257474 A1* | 9/2018 | Ranade | ............ | B60K 6/36 |

OTHER PUBLICATIONS

Office Action dated Aug. 7, 2017, issued in corresponding Japanese Patent Application No, 2016-037931 and a partial English translation. (4 pages).

Canadian Office Action dated Jan. 2, 2018, issued in corresponding Canadian Patent Application No. 2,958,730 (5 pages).

* cited by examiner

AUTOMATIC TRANSMISSION, CONTROL METHOD OF AUTOMATIC TRANSMISSION, VEHICLE AND CONTROL METHOD OF VEHICLE

CROSS-REFERENCE TO RELATED APPLICATION

This application is based upon and claims the benefit of priority from the prior Japanese Patent Application No. 2016-037931, filed on Feb. 29, 2016, the entire contents of which are incorporated herein by reference.

BACKGROUND OF THE INVENTION

Field of the Invention

The present invention relates to a vehicle.

Description of the Related Art

As an automatic transmission, a so-called dual clutch transmission is known. The dual clutch transmission includes two transmission mechanisms that implement different gear ratios, and connects/disconnects the two transmission mechanisms to/from a driving source such as an internal combustion engine, thereby suppressing interruption of power transmission to the drive wheels at the time of gear change. A transmission that maintains the stop state of a vehicle using interlock of the transmission is also known. Japanese Patent No. 5081215 discloses, in a dual clutch transmission, intentionally putting a vehicle in two speed gears for parking lock, thereby interlocking the transmission to maintain the stop state of the vehicle.

When canceling interlock, it may be difficult to immediately cancel the interlock due to a jam in an engagement mechanism or the like. If such a fault in interlock cancel or various kinds of errors leading to a loss of some functions of a vehicle can automatically be recovered without sending the vehicle to a repair shop, the convenience of the occupant improves. However, depending on the situation of the vehicle, automatic recovery may be inappropriate.

SUMMARY OF THE INVENTION

It is an object of the present invention to recover a lost function in accordance with the situation of a vehicle.

According to an aspect of the present invention, there is provided an automatic transmission comprising: a first transmission mechanism to which a driving force of a driving source is input through a first clutch and which is configured to switch driving force transmission paths to an output member to establish a first set of gear ratios; a second transmission mechanism to which the driving force of the driving source is input through a second clutch and which is configured to switch driving force transmission paths to the output member to establish a second set of gear ratios; and a control unit, wherein a one-way clutch is provided in a driving force transmission path that establishes a first certain gear ratio in the first set, the first transmission mechanism comprises: an input shaft to which the driving force of the driving source is input through the first clutch; a first transmission gear provided on the input shaft and configured to establish the first certain gear ratio; a plurality of second transmission gears provided on the input shaft and configured to establish remaining gear ratios in the first set; and a switching mechanism configured to perform engagement and disengagement between the input shaft and the plurality of second transmission gears, a driving transmission direction of the one-way clutch is set such that a rotation inputted from a wheel side to the output member in a predetermined rotational direction is transmitted to the input shaft, the predetermined rotational direction corresponding to a backward movement of a vehicle, and when disengagement by the switching mechanism is impossible, the control unit can execute recovery control to enable the disengagement on condition that a driver performs a predetermined operation.

According to another aspect of the present invention, there is provided a control method of an automatic transmission which comprises: a first transmission mechanism to which a driving force of a driving source is input through a first clutch and which is configured to switch driving force transmission paths to an output member to establish a first set of gear ratios; and a second transmission mechanism to which the driving force of the driving source is input through a second clutch and which is configured to switch driving force transmission paths to the output member to establish a second set of gear ratios, a one-way clutch is provided in the driving force transmission path that establishes a first certain gear ratio in the first set, wherein the first transmission mechanism comprises: an input shaft to which the driving force of the driving source is input through the first clutch; a first transmission gear provided on the input shaft and configured to establish the first certain gear ratio; a plurality of second transmission gears provided on the input shaft and configured to establish remaining gear stages in the first set; and a switching mechanism configured to perform engagement and disengagement between the input shaft and the plurality of second transmission gears, and a driving transmission direction of the one-way clutch is set such that a rotation inputted from a wheel side to the output member in a predetermined rotational direction is transmitted to the input shaft, the predetermined rotational direction corresponding to a backward movement of a vehicle, the control method comprising: determining whether disengagement by the switching mechanism is impossible; and upon determining that the disengagement is impossible, executing recovery control to enable the disengagement on condition that a driver performs a predetermined operation.

According to still another aspect of the present invention, there is provided a vehicle comprising: a notification unit configured to make a notification to prompt a driver to perform a predetermined operation in a case in which a predetermined function of the vehicle is lost; and a control unit configured to start a recovery operation of the predetermined function on condition that the predetermined operation is performed.

According to still another aspect of the present invention, there is provided a control method of a vehicle, comprising: making a notification to prompt a driver to perform a predetermined operation in a case in which a predetermined function of the vehicle is lost; and starting a recovery operation of the function on condition that the predetermined operation is performed.

Further features of the present invention will become apparent from the following description of exemplary embodiments (with reference to the attached drawings).

DESCRIPTION OF THE EMBODIMENTS

<Arrangement of Automatic Transmission>

Figure 1:
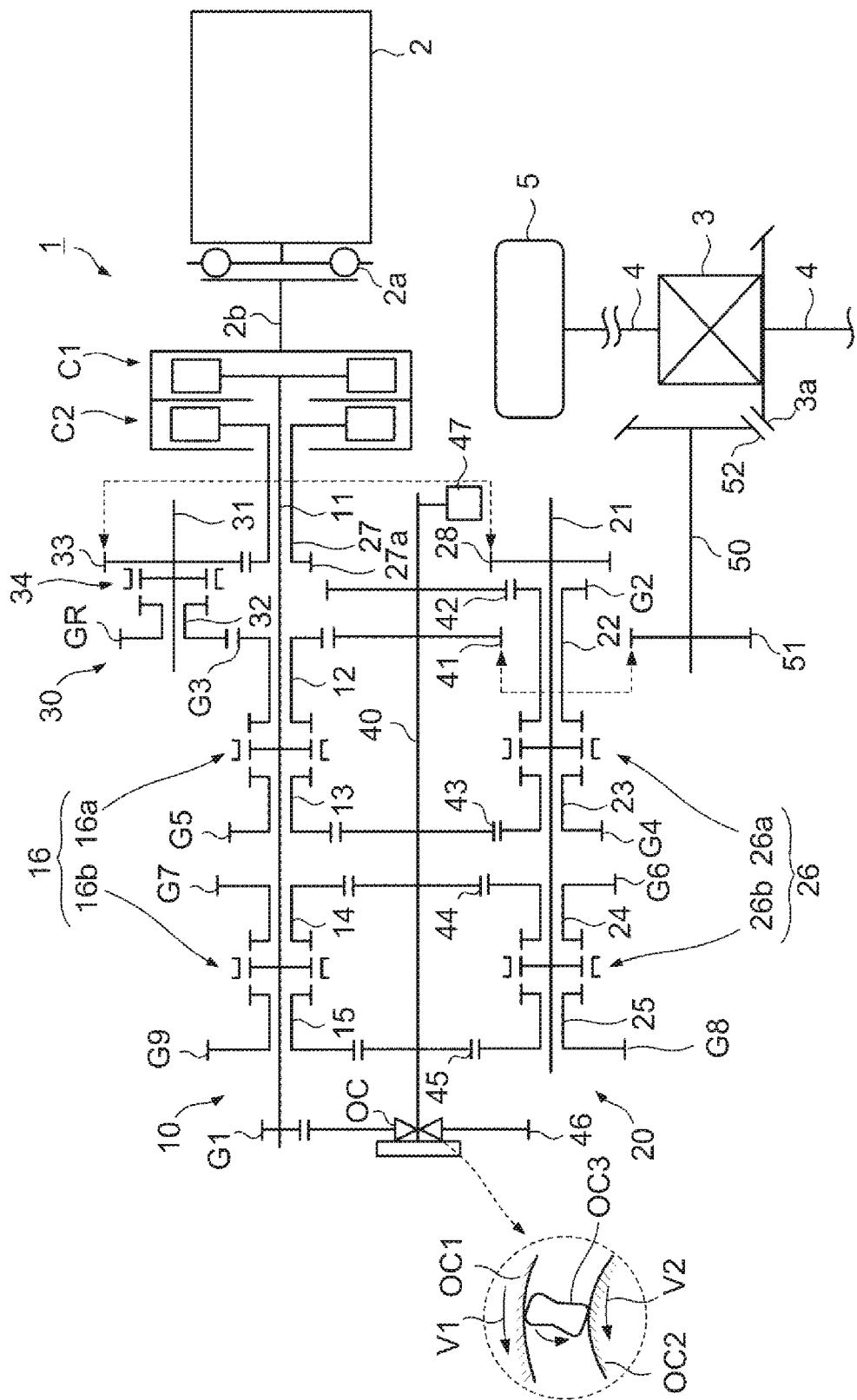
FIG. 1 is a schematic view of an automatic transmission according to an embodiment of the present invention.

FIG. 1 is a schematic view (skeleton diagram) of an automatic transmission 1 according to an embodiment of the present invention. The automatic transmission 1 decelerates the rotation driving force output from a driving source 2, outputs the force to a final reduction gear 3, and drives, through left and right drive shafts 4, wheels 5 (only one side is illustrated in FIG. 1) that are left and right drive wheels. The final reduction gear 3 includes, for example, differential gears connected to the drive shafts 4.

The automatic transmission 1 is mounted on, for example, a midship engine/rear drive type vehicle. The number of gear ratios of the automatic transmission 1 can appropriately be designed. In this embodiment, the automatic transmission 1 has nine forward gears and one reverse gear, as will be described later. The driving source 2 is an internal combustion engine here, but may be an electric motor or a unit that combines an internal combustion engine and an electric motor. The driving force of the driving source 2 is input to the automatic transmission 1 through a flywheel 2a and an output shaft 2b.

The automatic transmission 1 is a dual clutch transmission including two transmission mechanisms 10 and 20 that implement different gear ratios, and a transmission mechanism 30 that implements the reverse gear. The driving force of the driving source 2 is input to the transmission mechanism 10 through a clutch C1. The transmission mechanism 10 switches driving force transmission paths to an output member 41, thereby establishing gear ratios (the first, third, fifth, seventh, and ninth speed gear ratios in this embodiment) corresponding to the set of odd-numbered gear ratios. The driving force of the driving source 2 is input to the transmission mechanism 20 through a clutch C2. The transmission mechanism 20 switches driving force transmission paths to the output member 41, thereby establishing the gear ratios (the second, fourth, sixth, and eighth speed gear ratios in this embodiment) corresponding to the set of even-numbered gear ratios.

Each of the clutches C1 and C2 connects/disconnects the transmission of the driving force to/from the corresponding one of the transmission mechanisms 10 and 20. Each of the clutches C1 and C2 is, for example, a wet-type multiple clutch, and includes an outer clutch plate concentrically and integrally attached to the output shaft 2b, an inner clutch plate connected to a corresponding one of the transmission mechanisms 10 and 20, an actuator that presses the inner clutch plate against the outer clutch plate, a return spring that separates the inner clutch plate from the outer clutch plate, and the like.

The transmission mechanism 10 includes an input shaft 11, a gear G1 and a plurality of gear members 12 to 15 which are provided to be coaxial with respect to the input shaft 11, and a switching mechanism 16. The input shaft 11 is rotatably supported by a transmission case (not shown). The input shaft 11 is connected to the inner clutch plate of the clutch C1, and the driving force of the driving source 2 is input to the input shaft 11 through the clutch C1. The gear G1 is the transmission gear for the first speed gear ratio, which is provided on the input shaft 11. The gear G1 is provided (for example, key-connected or spline-connected) to be unrotatable relative to the input shaft 11, and always rotates during the rotation of the input shaft 11.

The gear members 12 to 15 are cylindrical members provided on the input shaft 11 to be relatively rotatable. A gear G3 that is the transmission gear for the third speed gear ratio is formed on the gear member 12. A gear G5 that is the transmission gear for the fifth speed gear ratio is formed on the gear member 13. A gear G7 that is the transmission gear for the seventh speed gear ratio is formed on the gear member 14. A gear G9 that is the transmission gear for the ninth speed gear ratio is formed on the gear member 15.

The switching mechanism 16 engages/disengages the gear members 12 to 15 (that is, the gears G3, G5, G7, and G9) with/from the input shaft 11. By engagement, an engaged gear member becomes unrotatable relative to the input shaft 11 and always rotates during the rotation of the input shaft 11. By disengagement, a disengaged gear member becomes rotatable relative to the input shaft 11.

In this embodiment, the switching mechanism 16 includes switching units 16a and 16b. The switching units 16a and 16b can have any structure. In this embodiment, the switching units 16a and 16b are each formed from a dog clutch, in particular, a dog clutch with a synchronization mechanism.

The switching unit 16a engages/disengages the gear members 12 and 13 with/from the input shaft 11. As the operation state of the switching unit 16a, one of three states, that is, a state (third speed gear ratio in-gear state) in which the gear member 12 engages with the input shaft 11, a state (fifth speed gear ratio in-gear state) in which the gear member 13 engages with the input shaft 11, and a state (neutral) in which both the gear members 12 and 13 disengage from the input shaft 11 can be selected.

The switching unit 16b engages/disengages the gear members 14 and 15 with/from the input shaft 11. As the operation state of the switching unit 16b, one of three states, that is, a state (seventh speed gear ratio in-gear state) in which the gear member 14 engages with the input shaft 11, a state (ninth speed gear ratio in-gear state) in which the gear member 15 engages with the input shaft 11, and a state (neutral) in which both the gear members 14 and 15 disengage from the input shaft 11 can be selected.

Additionally, a gear member 27 is coaxially provided on the input shaft 11. The gear member 27 is a cylindrical member provided on the input shaft 11 to be relatively rotatable, and is connected to the inner clutch plate of the clutch C2. A gear 27a is formed on the gear member 27 and always meshes with a gear 33 of the transmission mechanism 30.

The transmission mechanism 30 includes an input shaft 31, a gear member 32, and a switching mechanism 34. The input shaft 31 is provided in parallel to the input shaft 11 and rotatably supported by the transmission case (not shown). The gear 33 is provided to be unrotatable relative to the input shaft 31. The gear member 32 is a cylindrical member provided on the input shaft 31 to be relatively rotatable. A gear GR that is the transmission gear for the reverse gear is formed on the gear member 32. The gear GR always meshes with the gear G3.

The switching mechanism 34 engages/disengages the gear member 32 (that is, the gear GR) with/from the input shaft 31. By engagement, the gear member 32 becomes unrotatable relative to the input shaft 31 and always rotates during the rotation of the input shaft 31. By disengagement, the gear member 32 becomes rotatable relative to the input shaft 31. In this embodiment, the switching mechanism 34 is also formed from a dog clutch with a synchronization mechanism. As the operation state of the switching mechanism 34, one of two states, that is, a state (reverse gear in-gear state) in which the gear member 32 engages with the input shaft 31 and a state (neutral) in which the gear member 32 disengages from the input shaft 31 can be selected.

The transmission mechanism 20 includes an input shaft 21, a gear 28 and a plurality of gear members 22 to 25 which are provided to be coaxial with respect to the input shaft 21, and a switching mechanism 26. The input shaft 21 is provided in parallel to the input shaft 11 and rotatably supported by the transmission case (not shown).

The gear 28 is provided to be unrotatable relative to the input shaft 21, and always meshes with the gear 33. Hence, the driving force of the driving source 2 is input to the input shaft 21 through the clutch C2 and the gears 33 and 28.

The gear members 22 to 25 are cylindrical members provided on the input shaft 21 to be relatively rotatable. A gear G2 that is the transmission gear for the second speed gear ratio is formed on the gear member 22. A gear G4 that is the transmission gear for the fourth speed gear ratio is formed on the gear member 23. A gear G6 that is the transmission gear for the sixth speed gear ratio is formed on the gear member 24. A gear G8 that is the transmission gear for the eighth speed gear ratio is formed on the gear member 25.

The switching mechanism 26 engages/disengages the gear members 22 to 25 (that is, the gears G2, G4, G6, and G8) with/from the input shaft 21. By engagement, an engaged gear member becomes unrotatable relative to the input shaft 21 and always rotates during the rotation of the input shaft 21. By disengagement, a disengaged gear member becomes rotatable relative to the input shaft 21.

In this embodiment, the switching mechanism 26 includes switching units 26a and 26b. Like the switching mechanism 16, the switching units 26a and 26b can have any structure. In this embodiment, the switching units 26a and 26b are each formed from a dog clutch, in particular, a dog clutch with a synchronization mechanism.

The switching unit 26a engages/disengages the gear members 22 and 23 with/from the input shaft 21. As the operation state of the switching unit 26a, one of three states, that is, a state (second speed gear ratio in-gear state) in which the gear member 22 engages with the input shaft 21, a state (fourth speed gear ratio in-gear state) in which the gear member 23 engages with the input shaft 21, and a state (neutral) in which both the gear members 22 and 23 disengage from the input shaft 21 can be selected.

The switching unit 26b engages/disengages the gear members 24 and 25 with/from the input shaft 21. As the operation state of the switching unit 26b, one of three states, that is, a state (sixth speed gear ratio in-gear state) in which the gear member 24 engages with the input shaft 21, a state (eighth speed gear ratio in-gear state) in which the gear member 25 engages with the input shaft 21, and a state (neutral) in which both the gear members 24 and 25 disengage from the input shaft 21 can be selected.

In this embodiment, the output member 41 is a gear provided on a countershaft 40 to be relatively unrotatable. The countershaft 40 is provided in parallel to the input shaft 11 and rotatably supported by the transmission case (not shown). In addition to the output member 41, gears 42 to 46 are coaxially provided on the countershaft 40. The gears 42 to 45 are provided to be unrotatable relative to the countershaft 40. The output member 41 always meshes with the gear G3. The gear 42 always meshes with the gear G2. The gear 43 always meshes with the gears G4 and G5. The gear 44 always meshes with the gears G6 and G7. The gear 45 always meshes with the gears G8 and G9.

The gear 46 is provided on the countershaft 40 through a one-way clutch OC. The one-way clutch OC rotates in one direction for driving transmission. The gear 46 always meshes with the gear G1. That is, the one-way clutch OC is provided in the driving force transmission path that establishes the first speed gear ratio.

The one-way clutch OC is a sprag one-way clutch as an example in this embodiment, and the driving transmission direction is set as follows. The rotation direction of the countershaft 40 during forward traveling of the vehicle will be referred to as a forward rotation direction here.

In this embodiment, if a rotation speed V1 of the gear 46 in the forward rotation direction exceeds a rotation speed V2 of the countershaft 40 in the forward rotation direction, a pivotal movement in the engaging direction is given to a sprag OC3 between an outer race OC1 and an inner race OC2 to set the one-way clutch OC in an engaging state, and the driving force of the input shaft 11 is transmitted to the countershaft 40. Hence, if the switching units 16a and 16b are at the neutral positions, the driving force of the input shaft 11 is transmitted to the countershaft 40 through the gears G1 and 46 and the one-way clutch OC during acceleration.

On the other hand, if the rotation speed V1 of the gear 46 in the forward rotation direction is less than the rotation speed V2 of the countershaft 40 in the forward rotation direction, the pivotal movement in the engaging direction is not given to the sprag OC3, and the outer race OC1 and the inner race OC2 are set in a non-engaging state. Hence, if one of the switching units 16a and 16b is set in the engaging state, the driving force of the input shaft 11 is transmitted to the countershaft 40 not through the gears G1 and 46 and the one-way clutch OC but through another path. For example, in the third speed gear ratio in-gear state, the driving force of the input shaft 11 is transmitted to the countershaft 40 through the gears G3 and 41. This also applies to the fifth speed gear ratio, the seventh speed gear ratio, and the ninth speed gear ratio.

With the arrangement that establishes the first speed gear ratio by the one-way clutch OC, the switching mechanism for the first speed gear ratio can be omitted.

The output member 41 always meshes with a gear 51. The gear 51 is provided on an output shaft 50 to be relatively unrotatable. The output shaft 50 is provided in parallel to the input shaft 11 and rotatably supported by the transmission case (not shown). A bevel gear 52 is also provided on the output shaft 50 to be relatively unrotatable. The bevel gear 52 always meshes with a bevel gear 3a of the final reduction gear 3. The driving force of the output shaft 50 is transmitted to the drive shafts 4 and the wheels 5 through the final reduction gear 3.

A parking lock device 47 is provided on the countershaft 40. The parking lock device 47 locks the countershaft 40 on the transmission case when the parking range is selected.

The driving force transmission path in each gear ratio will be described next.

When the first speed gear ratio is selected, all the switching mechanisms 16, 26, and 34 are set at the neutral positions, the clutch C1 is set in the connected state, and the clutch C2 is set in the released state. The driving force of the driving source 2 is transmitted through the path of clutch C1→input shaft 11→gear G1→gear 46→one-way clutch OC→countershaft 40→output member 41→gear 51→output shaft 50.

When the second speed gear ratio is selected, all the switching mechanisms 16 and 34 and the switching unit 26b are set at the neutral positions, and the switching unit 26a sets the second speed gear ratio in-gear state. The clutch C2 is set in the connected state, and the clutch C1 is set in the released state. The driving force of the driving source 2 is transmitted through the path of clutch C2→gear member 27 (gear 27a)→gear 33→gear 28→input shaft 21→gear G2→gear 42→countershaft 40→output member 41→gear 51→output shaft 50.

When the third speed gear ratio is selected, all the switching mechanisms 26 and 34 and the switching unit 16b are set at the neutral positions, and the switching unit 16a sets the third speed gear ratio in-gear state. The clutch C1 is set in the connected state, and the clutch C2 is set in the released state. The driving force of the driving source 2 is transmitted through the path of clutch C1→input shaft 11→gear G3→output member 41→gear 51→output shaft 50.

When the fourth speed gear ratio is selected, all the switching mechanisms 16 and 34 and the switching unit 26b are set at the neutral positions, and the switching unit 26a sets the fourth speed gear ratio in-gear state. The clutch C2 is set in the connected state, and the clutch C1 is set in the released state. The driving force of the driving source 2 is transmitted through the path of clutch C2→gear member 27 (gear 27a)→gear 33→gear 28→input shaft 21→gear G4→gear 43→countershaft 40→output member 41→gear 51→output shaft 50.

When the fifth speed gear ratio is selected, all the switching mechanisms 26 and 34 and the switching unit 16b are set at the neutral positions, and the switching unit 16a sets the fifth speed gear ratio in-gear state. The clutch C1 is set in the connected state, and the clutch C2 is set in the released state. The driving force of the driving source 2 is transmitted through the path of clutch C1→input shaft 11→gear G5→gear 43→countershaft 40→output member 41→gear 51→output shaft 50.

When the sixth speed gear ratio is selected, all the switching mechanisms 16 and 34 and the switching unit 26a are set at the neutral positions, and the switching unit 26b sets the sixth speed gear ratio in-gear state. The clutch C2 is set in the connected state, and the clutch C1 is set in the released state. The driving force of the driving source 2 is transmitted through the path of clutch C2→gear member 27 (gear 27a)→gear 33→gear 28→input shaft 21→gear G6→gear 44→countershaft 40→output member 41→gear 51→output shaft 50.

When the seventh speed gear ratio is selected, all the switching mechanisms 26 and 34 and the switching unit 16a are set at the neutral positions, and the switching unit 16b sets the seventh speed gear ratio in-gear state. The clutch C1 is set in the connected state, and the clutch C2 is set in the released state. The driving force of the driving source 2 is transmitted through the path of clutch C1→input shaft 11→gear G7→gear 44→countershaft 40→output member 41→gear 51→output shaft 50.

When the eighth speed gear ratio is selected, all the switching mechanisms 16 and 34 and the switching unit 26a are set at the neutral positions, and the switching unit 26b sets the eighth speed gear ratio in-gear state. The clutch C2 is set in the connected state, and the clutch C1 is set in the released state. The driving force of the driving source 2 is transmitted through the path of clutch C2→gear member 27 (gear 27a)→gear 33→gear 28→input shaft 21→gear G8→gear 45→countershaft 40→output member 41→gear 51→output shaft 50.

When the ninth speed gear ratio is selected, all the switching mechanisms 26 and 34 and the switching unit 16a are set at the neutral positions, and the switching unit 16b sets the ninth speed gear ratio in-gear state. The clutch C1 is set in the connected state, and the clutch C2 is set in the released state. The driving force of the driving source 2 is transmitted through the path of clutch C1→input shaft 11→gear G9→gear 45→countershaft 40→output member 41→gear 51→output shaft 50.

When the reverse gear is selected, both the switching mechanisms 16 and 26 are set at the neutral positions, and the switching mechanism 34 sets the in-gear state. The clutch C2 is set in the connected state, and the clutch C1 is set in the released state. The driving force of the driving source 2 is transmitted through the path of clutch C2→gear member 27 (gear 27a)→gear 33→input shaft 31→gear GR→gear G3→output member 41→gear 51→output shaft 50.

Figure 2:
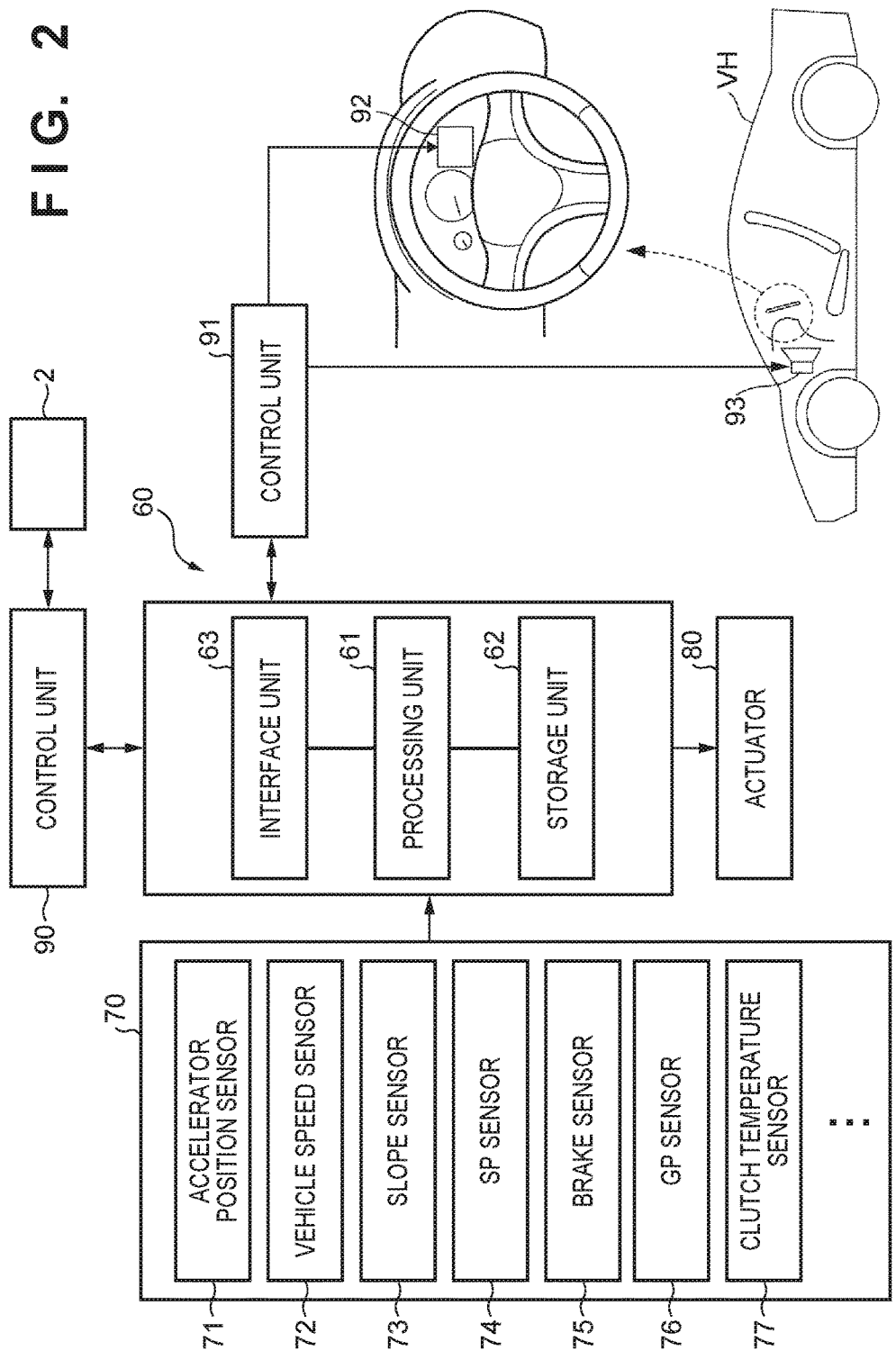
FIG. 2 is a block diagram of the control unit of the automatic transmission shown in FIG. 1.

A control unit 60 of the automatic transmission 1 will be described next with reference to FIG. 2. FIG. 2 is a block diagram showing the circuit arrangement of the control unit 60. The control unit 60 is an ECU configured to control the automatic transmission 1, and includes a processing unit 61 such as a CPU, a storage unit 62 such as a RAM and a ROM, and an interface unit 63 that interfaces an external device and the processing unit 61. The control unit 60 is communicably connected to a control unit 90 that is an ECU configured to control the driving source 2 as an internal combustion engine and a control unit 91 that is an ECU configured to control a notification unit.

The processing unit 61 executes a program stored in the storage unit 62, and controls various kinds of actuators 80 based on the detection results of various kinds of sensors 70. Concerning control examples to be described later, the various kinds of sensors 70 include, for example, an accelerator position sensor 71, a vehicle speed sensor 72, a slope sensor 73, an SP (Shift Position) sensor 74, a brake sensor 75, a GP sensor (gear position sensor) 76, and a clutch temperature sensor 77.

The accelerator position sensor 71 is a sensor that detects, for example, the depression amount of the accelerator pedal by the driver. The vehicle speed sensor 72 is a sensor that detects, for example, the rotation speed of the countershaft 40. The slope sensor 73 detects the slope of the traveling road of the vehicle. The slope sensor 73 can be a sensor configured to directly detect the slope of the traveling road, or an acceleration sensor or a speed sensor. If the slope sensor 73 is an acceleration sensor or a speed sensor, the slope of the traveling road can be calculated based on, for example, the relationship between the accelerator opening and the acceleration or speed of the vehicle.

The SP (Shift Position) sensor 74 is a sensor configured to detect the shift position selected by the driver. As the shift positions, for example, four types of shift positions, that is, the P range (parking range), D range (drive range), N range (neutral range), and R range (reverse range) exist. The D range may include an automatic gear change mode and a manual gear change mode. The brake sensor 75 is a sensor configured to detect a driver's operation on the foot brake. The GP sensor 76 is a sensor configured to detect the in-gear state or off-gear state in each of the switching mechanisms 16, 26, and 34, and the GP sensor 76 can be provided on each transmission gear. The clutch temperature sensor 77 is provided on each of the clutches C1 and C2 and measures the temperature.

The various kinds of actuators 80 include an actuator that drives the clutches C1 and C2 and actuators provided in the switching units 16a, 16b, 26a, and 26b and the switching mechanism 34. These actuators are, for example, motors or control valves. In this embodiment, the switching units 16a, 16b, 26a, and 26b are assumed to be electric actuators.

When the D range is selected, the processing unit 61 selects a gear ratio based on the travelling state of the vehicle in accordance with, for example, a gear change map stored in the storage unit 62. The gear ratio is normally switched one by one. For example, at the time of acceleration, the gear ratio is switched from first speed gear ratio→second speed gear ratio→third speed gear ratio . . . . At the time of deceleration as well, the gear ratio is switched from seventh speed gear ratio→sixth speed gear ratio→fifth speed gear ratio . . . . When switching from an odd-numbered speed gear ratio to an even-numbered speed gear ratio, the clutch C2 is released in advance, and the in-gear state of the next even-numbered speed gear ratio is set. Then, when switching from the odd-numbered speed gear ratio to the even-numbered speed gear ratio, since the next even-numbered speed gear ratio is established by the release of the clutch C1 and the connection of the clutch C2, the gear change time can be shortened. This also applies to switching from an even-numbered speed gear ratio to an odd-numbered speed gear ratio.

The control unit 91 controls a notification unit configured to make various kinds of notifications to the occupant of a vehicle VH. In this embodiment, the notification unit includes a display device 92 and a audio output device 93 and can make a notification by image display and a notification by audio. A notification by one of them may be made.

The display device 92 is an image display device such as an LCD. The display device 92 is arranged at a position visible to the driver. In this embodiment, the display device 92 is arranged on an instrument panel and constitutes an MID (Multi Information Display).

<Hill Hold>

Figure 3:
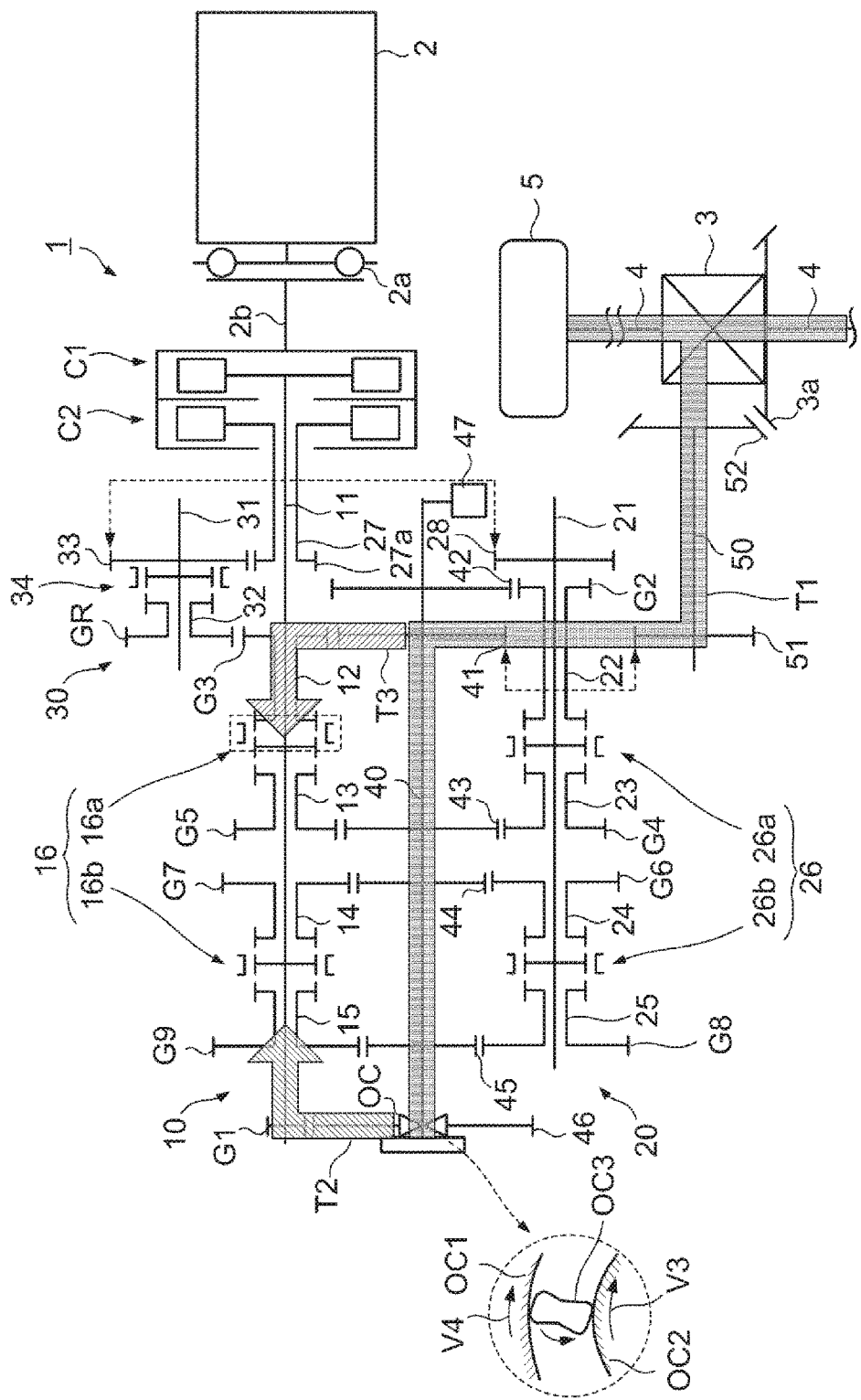
FIG. 3 is an explanatory view of a torque flow at the time of a stop on a climbing hill.

During a stop in the D range, the processing unit 61 normally sets the switching mechanisms 16, 26, and 34 at the neutral positions, and releases the clutches C1 and C2. If the driver releases the foot brake during a stop on a climbing hill in the D range, the vehicle may move back. The backward movement of the vehicle is prevented by intentionally causing interlock in the automatic transmission 1. FIG. 3 is an explanatory view of the principle and shows a torque flow at the time of the backward movement of the vehicle.

When the vehicle moves back, driving in a direction reverse to that in a forward movement is given by the drive shafts 4 and transmitted to the countershaft 40, as indicated by T1. The rotation direction of the countershaft 40 at this time is the direction reverse to the above-described forward rotation direction.

The driving transmission direction of the one-way clutch OC is the same as described above. In the above setting, if a rotation speed V3 of the countershaft 40 in the reverse direction exceeds a rotation speed V4 of the gear 46 in the reverse direction, a pivotal movement in the engaging direction is given to the sprag OC3, and the outer race OC1 and the inner race OC2 are set in the engaging state. Hence, the driving force of the backward movement is transmitted to the input shaft 11 through the gears 46 and G1. That is, if a rotation in a direction corresponding to the backward movement of the vehicle is input from the side of the wheels 5 to the output member 41, the rotation is transmitted to the input shaft 11.

If one of the odd-numbered speed gear ratios other than the first speed gear ratio is put in gear, a torque circulation occurs between the countershaft 40 and the input shaft 11, and interlock is generated. T3 in FIG. 3 represents a case in which the gears are put in gear for the third speed gear ratio. Since the first speed gear ratio is always put in gear, putting only one gear ratio in gear suffices. Hence, the state necessary for preventing the backward movement at the time of a stop can be established in a shorter time. The gear ratio to be put in gear may be the fifth speed gear ratio, the seventh speed gear ratio, or the ninth speed gear ratio. When the third speed gear ratio whose ratio is close to the first speed gear ratio is put in gear, the load applied to each shaft can be reduced in some cases.

Note that in this embodiment, the one-way clutch OC is provided between the gear 46 and the input shaft 11, but may be provided between the input shaft 11 and the gear G1 depending on an arrangement of an transmission. In addition, the one-way clutch OC is provided in the driving force transmission path to establish the first speed gear ratio, but may be provided in a driving force transmission path to establish another gear ratio depending on an arrangement of an transmission. For example, the one-way clutch OC may be provided in the driving force transmission path to establish the second speed gear ratio. If the one-way clutch OC is provided in a driving force transmission path to establish an even-numbered speed gear ratio, another gear ratio to be put in gear to attain interlock is also an even-numbered speed gear ratio.

Figure 4A:
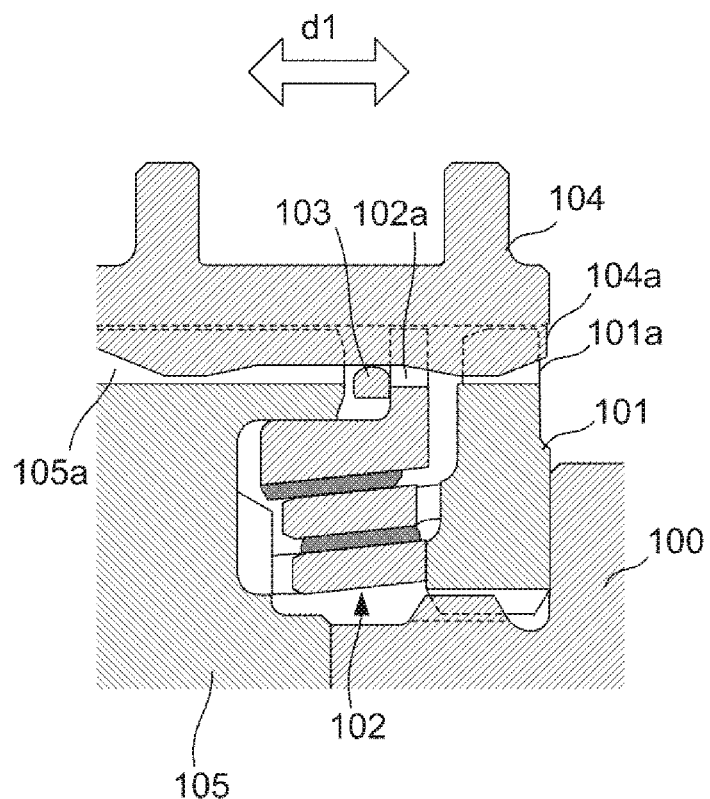
FIGS. 4A and 4B are explanatory views showing an example of the arrangement of a dog clutch

The relationship between the switching mechanism 16 and interlock will be described next. If a dog clutch is employed as the switching mechanism 16, interlock is not carelessly canceled as an advantage when such interlock is generated. FIG. 4A is a sectional view showing an example of the dog clutch. This is a sectional view taken along a plane including the input shaft. FIG. 4A shows an in-gear state.

A dog gear 101 with dog teeth 101a is spline-connected to a gear member 100 that forms a transmission gear. A double-cone blocking ring 102 and a synchronizer spring 103 are provided between the dog gear 101 and a hub 105 fixed to the input shaft.

A sleeve 104 is provided to be reciprocally moved by the driving force of an actuator in an axial direction d1 of the input shaft. Spline teeth 104a of the sleeve 104 can reciprocally move between dog teeth 102a of the blocking ring 102 and between the dog teeth 101a of the dog gear 101 while being guided between spline teeth 105a of the hub 105. As shown in FIG. 4A, the spline teeth 104a are placed across the spline teeth 105a and the dog teeth 101a, thereby attaining an in-gear state.

Figure 4B:
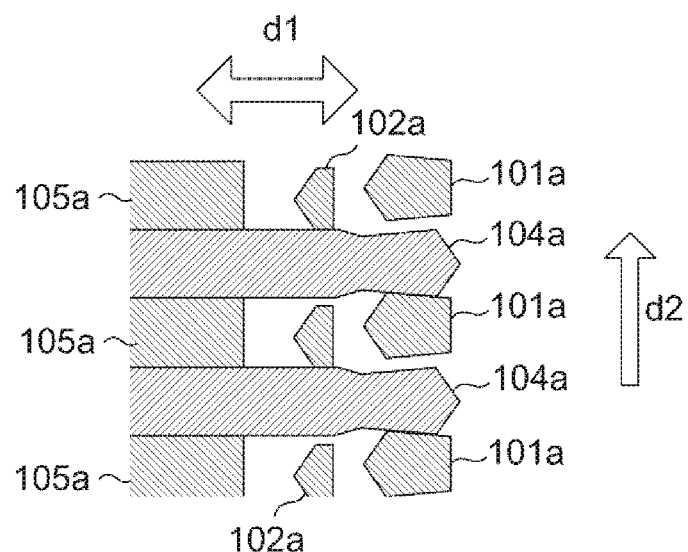

FIG. 4B is a sectional view taken along a plane in the circumferential direction passing through the spline teeth 104a and the like. FIG. 4B shows the cross-sectional shape of the spline teeth 104a and 105a and the dog teeth 101a and 102a.

At the distal end of each spline tooth 104a, the side surfaces are not parallel but are tilted to form a tapered shape. Each dog tooth 101a has a tapered shape corresponding to the tapered shape so the side surfaces are not parallel but are tilted.

With this tapered shape, if a driving force in the direction of an arrow d2 acts on the gear member 100, the spline teeth 104a and the dog teeth 101a more deeply mesh with each other and hardly disengage. In the example of FIG. 3, if the vehicle stops on a climbing hill, the gear G3 that is the transmission gear for the third speed gear ratio and the structure of the switching unit 16a corresponding to the sleeve 104 more deeply mesh with each other, and the gear G3 hardly disconnects.

On the other hand, when the vehicle starts, the interlock needs to be canceled. In the example of FIG. 4A, the sleeve 104 is retreated from the dog gear 101 by the driving force of an actuator (not shown) to attain an off-gear state. However, if an actuator whose output is relatively small is used, disengagement may be difficult because of the meshing between the spline teeth 104a and the dog teeth 101a.

However, if the driving force in the forward direction acts on the input shaft 11, the driving force gradually balances with the driving force of the backward movement caused by the weight of the vehicle on the climbing hill, and the meshing between the spline teeth 104a and the dog teeth 101a weakens to facilitate disengagement. That is, in the example of FIG. 3, vehicle start control is performed to, for example, set the clutch C1 in a half-engaged state while causing the switching unit 16a to put the third speed gear ratio off gear. When the driving force of the driving source 2 is transmitted to the input shaft 11, and the driving force of the gravity on the climbing hill and the driving force from the driving source 2 balance, the resistance in the off-gear state by the meshing between the spline teeth 104a and the dog teeth 101a becomes almost 0, and the third speed gear ratio can reliably be put off gear. Hence, any special mechanism is not needed to cancel interlock.

Control Examples

Figure 5C:
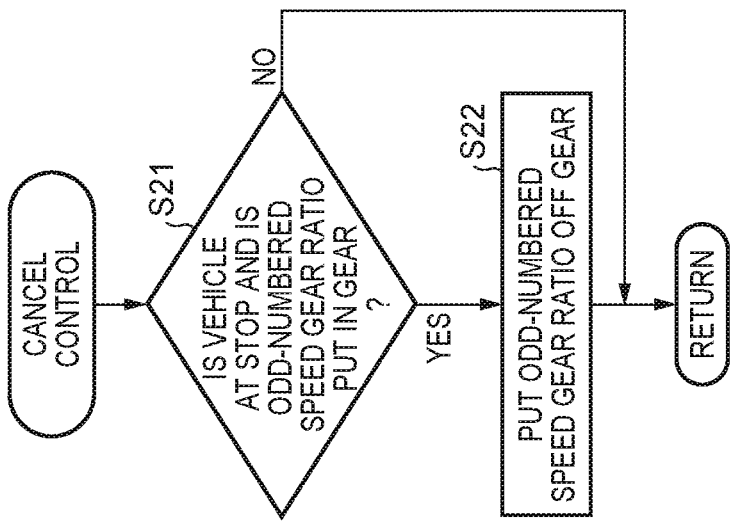
FIGS. 5A to 5C are flowcharts showing examples of processing of the control unit.

Examples of control executed by the processing unit 61 regarding the above-described hill hold will be described with reference to FIGS. 5A to 5C. FIG. 5A shows an example of backward movement prevention control by interlock.

In step S1, it is determined whether a predetermined condition is met. Upon determining that a predetermined condition is met, the process advances to step S2. Upon determining that a predetermined condition is not met, the processing of one unit ends.

The predetermined condition includes at least the stop of the vehicle. The stop of the vehicle can be determined based on the detection result of the speed sensor 72. For example, if the detection result is less than a threshold, it can be determined that the vehicle has stopped.

The predetermined condition may include, for example, the stop of the vehicle on a climbing hill. If the stop of the vehicle on a climbing hill is included in the condition, the backward movement of the vehicle can be prevented without unnecessarily causing interlock. Whether the vehicle has stopped on a climbing hill can be determined based on the detection result of the slope sensor 73. For example, if a slope more than a predetermined slope is detected, it can be determined that the vehicle has stopped on a climbing hill. Conversely, an arrangement that does not use the stop of the vehicle on a climbing hill as a condition can also be employed. As described above, interlock can reliably be canceled by the start of the vehicle. Hence, interlock may always be generated at the time of the stop of the vehicle. If the stop of the vehicle on a climbing hill is not used as a condition, slope detection is unnecessary.

The predetermined condition may include, for example, selection of the D range. During selection of the D range, on a climbing hill, the necessity of hill hold is high at the time of release of the foot brake. In this case, the predetermined condition may further include detection of leg power reduction on the foot brake. This is because the possibility that the vehicle does not move back is high during braking using the foot brake, and at the start of release of the foot brake, the possibility of the backward movement rises. Leg power reduction on the foot brake can be determined based on the detection result of the brake sensor 75.

The predetermined condition may include non-detection of selection of the P range. At the time of lock by parking lock, the necessity of hill hold by interlock is low. The non-detection of selection of the P range may be determined at timing after the elapse of a predetermined time from the stop of the vehicle.

In step S2, the switching mechanism 16 is instructed to put one of the odd-numbered speed gear ratios other than the first speed gear ratio in gear, and the processing of one unit ends. The odd-numbered speed gear ratio to be put in gear at this time will be referred to as an IL odd-numbered speed gear ratio in the following explanation.

Figure 5B:
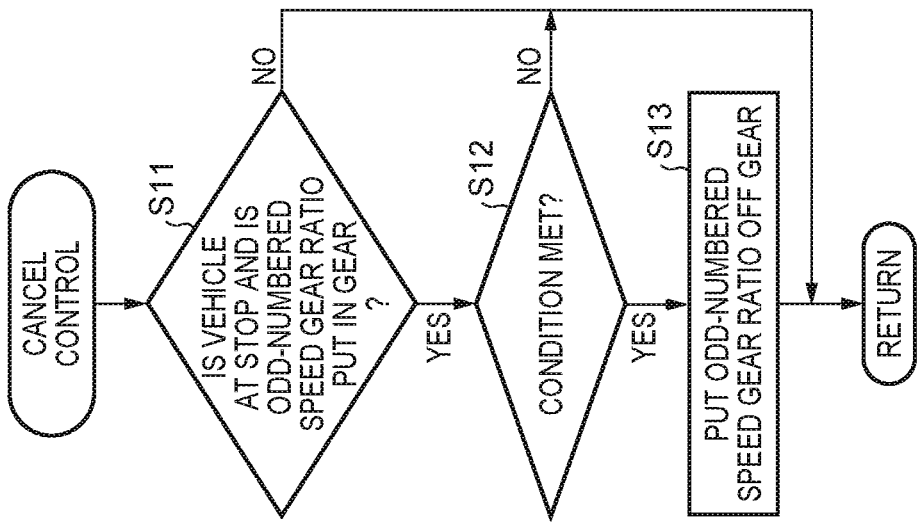
Figure 5A:
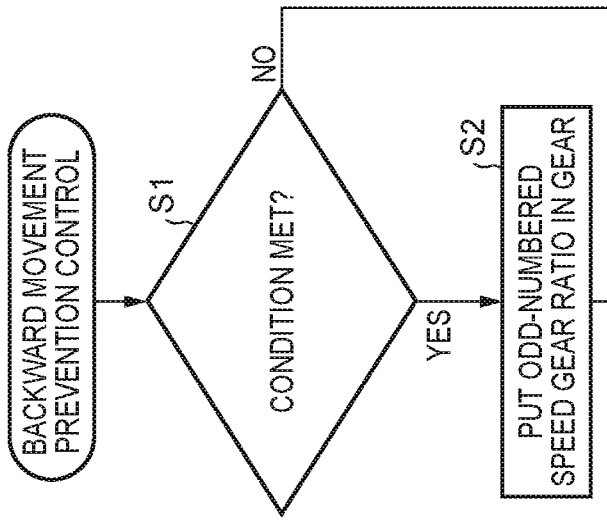

FIG. 5B shows an example of cancel control of canceling interlock after the backward movement prevention control. In step S11, it is determined whether the vehicle is at a stop, and the IL odd-numbered speed gear ratio is in gear. If YES in step S11, the process advances to step S12. Otherwise, the processing of one unit ends.

In step S12, it is determined whether a predetermined condition is met. Upon determining that a predetermined condition is met, the process advances to step S13. Upon determining that a predetermined condition is not met, the processing of one unit ends. Here, the predetermined condition is, for example, that the estimated value of the driving force required by the driver exceeds a threshold. The driving force required by the driver is the forward driving force of the vehicle required by the driver. The estimated value can be derived from, for example, the accelerator opening. The accelerator opening can be calculated based on the detection result of the accelerator position sensor 71. The clutch C1 and the driving source 2 can be driven and controlled in accordance with the estimated value of the driving force required by the driver. If the driving force input to the input shaft 11 increases, the IL gear ratio can readily be put off gear, as described with reference to FIG. 4B.

In step S13, the switching mechanism 16 is instructed to put the IL odd-numbered speed gear ratio off gear. The processing of one unit thus ends.

FIG. 5C shows another example of cancel control of canceling interlock after the backward movement prevention control. In the example of FIG. 5B, on condition that a predetermined condition is met in step S12, the IL gear ratio is put off gear in step S13. However, the IL gear ratio may be put off gear after execution of the backward movement prevention control before the vehicle start condition is met. The vehicle start condition may be, for example, detection of a driver's operation on the accelerator pedal by the accelerator position sensor 71.

In the example of FIG. 5C, after the IL gear ratio is put in gear to attain the interlock state, the off-gear operation of the IL gear ratio is performed immediately concerning the control.

First, in step S21, it is determined whether the vehicle is at a stop, and the IL odd-numbered speed gear ratio is in gear. If YES in step S21, the process advances to step S22. Otherwise, the processing of one unit ends. In step S22, the switching mechanism 16 is instructed to put the IL gear ratio off gear. The processing of one unit thus ends.

Step S22 means that the off-gear operation of the IL gear ratio is started concerning the control. In other words, it means that the operation of the actuator of the switching mechanism 16 that puts the IL gear ratio off gear is started. If the output of the actuator is small, the in-gear state of the IL gear ratio is maintained even after the start of the operation, as described with reference to FIG. 4B. Especially if the slope of the climbing hill is large, the in-gear state of the IL gear ratio is maintained even if off-gear control is performed. Conversely, if the slope of the climbing hill is small, the IL gear ratio may be put off gear by the off-gear control. In this case, however, the backward movement of the vehicle is considered not to occur.

Even if the in-gear state of the IL gear ratio is maintained, when the vehicle starts, at a timing at which the driving force of the backward movement by the gravity on the climbing hill and the driving force from the driving source 2 balance, the resistance in the off-gear state becomes almost 0, and the IL gear ratio is put off gear, as described with reference to FIG. 4B. By this control, the condition determination process of step S12 can be omitted.

<Forced Cancel of Interlock>

Interlock of this embodiment can be almost reliably canceled by inputting the driving force from the driving source 2 even if a jam occurs in the switching mechanism 16. However, the driver may select not the start but the parking range or neutral range. In this case, the switching mechanism 16 needs to be put off gear. However, if a jam occurs in the switching mechanism 16, it may be impossible to perform the off-gear operation only by the output of the actuator and establish the range selected by the driver. In addition, if unintended interlock occurs due to a special traveling state or the like, a strong jam may occur in the switching mechanism 16, and the off-gear operation may be impossible only by the output of the switching mechanism 16.

Figure 6:
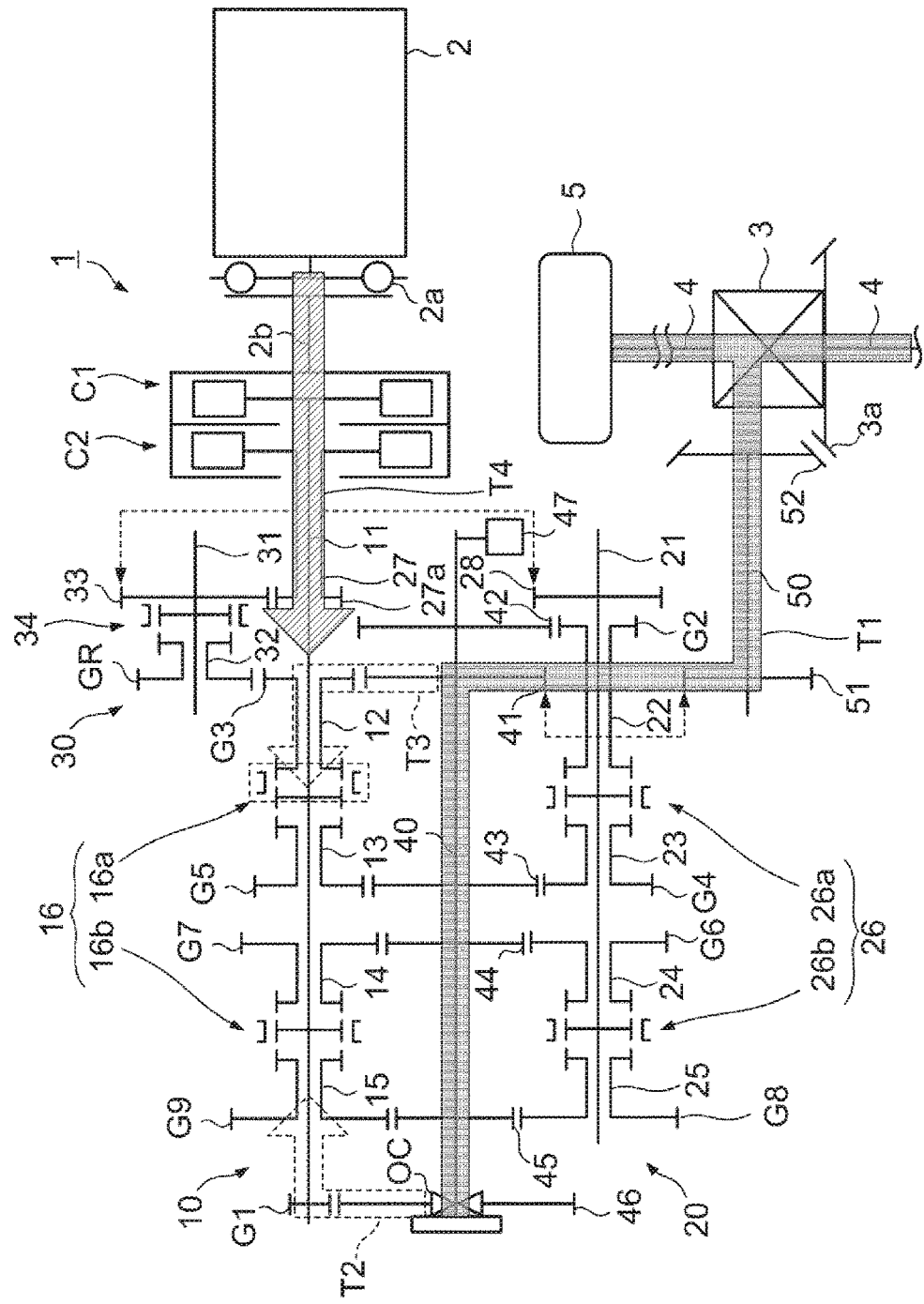
FIG. 6 is an explanatory view of a torque flow at the time of recovery control.

A mechanism that forcibly cancels interlock in such a case, that is, a mechanism that forcibly puts the transmission gears for an odd-numbered speed gear ratio in the in-gear state off gear will be described. In this embodiment, recovery control of inputting the driving force of the driving source 2 to the input shaft 11 by connection control of the clutch C1 is performed. FIG. 6 is an explanatory view of this. FIG. 6 corresponds to the state described with reference to FIG. 3 in which interlock has occurred, and shows a state in which the transmission gear G3 for the third speed gear ratio is put in gear. The driving force is input from the driving source 2 to the input shaft 11 through the clutch C1, and the transmission torque of the driving force by the clutch C1 is adjusted (the transmission torque is controlled by engaging the clutch C1 halfway), thereby inputting the driving force while maintaining the rotational speed of the input shaft 11 at 0.

When a torque T4 input from the driving source 2 to the input shaft 11 and the torque T1 input from the drive shafts 4 balance, the circulation torque between the countershaft 40 and the input shaft 11 can be canceled or weakened. Hence, the meshing as described with reference to FIG. 4B weakens, and the transmission gear G3 can be put off gear by the output of the actuator of the switching mechanism 16.

Figure 7:
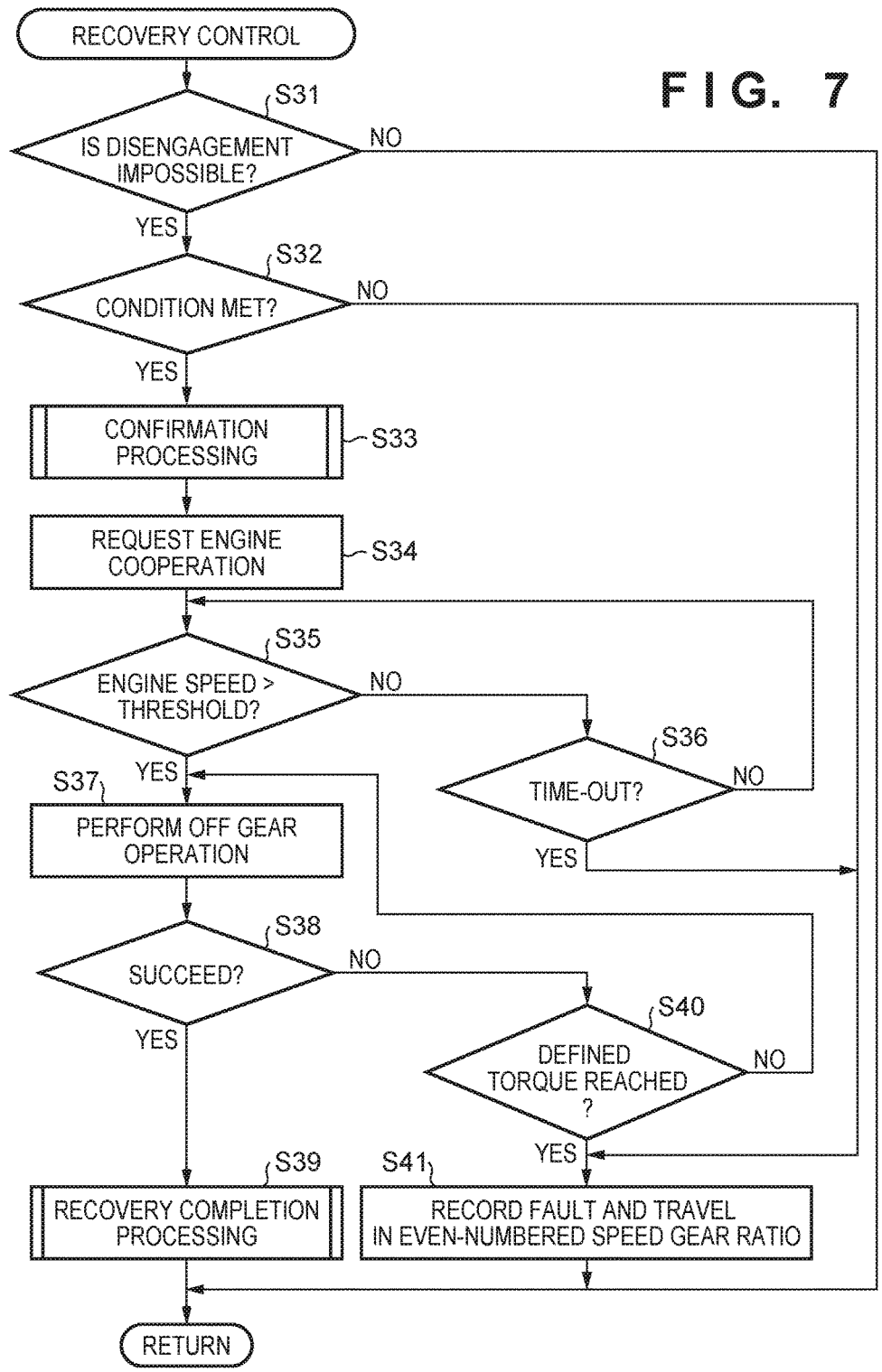
FIG. 7 is a flowchart showing an example of processing of the control unit.

FIG. 7 shows an example of control executed by the processing unit 61 concerning the recovery control shown in FIG. 6. In step S31, it is determined whether disengagement is impossible for an engaged transmission gear whose disengagement was attempted by the actuator of the switching mechanism 16. Upon determining that the disengagement is impossible, the process advances to step S32. Otherwise, the processing of one unit ends. This determination can be done based on the detection result of the GP sensor 76. In the example of FIG. 6, the disengagement disable state of the transmission gear G3 is detected.

In step S32, it is determined whether a predetermined condition is met. Here, for the subsequent recovery operation, the condition on the side of the automatic transmission 1 is determined. The predetermined condition can include, for example, the temperature of the clutch C1 that is less than a threshold. In the recovery control described with reference to FIG. 6, since the clutch C1 is in the half-engaged state, the temperature may readily rise. For this reason, the recovery control can be prohibited if the temperature of the clutch C1 is already high. This determination can be done based on the detection result of the clutch temperature sensor 77.

Upon determining in step S32 that the condition is met, the process advances to step S33. If the condition is not met, it is determined that the recovery control cannot be continued, and the process advances to step S41.

In step S33, confirmation processing is performed. Here, for the subsequent recovery operation, the condition (the presence/absence of an agreement) on the driver side is determined. If the driver agrees, he/she can be prevented from feeling uncomfortable in the recovery operation by the recovery control. In addition, the recovery operation can be performed in accordance with the situation of the vehicle. The subsequent recovery operation needs a predetermined time. For this reason, in a case in which the driver is in a hurry or depending on the ambient traffic, immediately performing the recovery operation is assumed to be inappropriate. If the driver agrees, the recovery operation can be performed in accordance with the situation of the vehicle, contributing to ensuring higher safety. Details of the confirmation processing of step S33 will be described later.

In step S34, the control unit 90 is requested to do cooperative control of the driving source 2. Here, the control unit 90 is instructed to increase the driving force of the driving source 2 and makes the rotational speed higher than the idling engine speed. In response to the instruction, the control unit 90 starts cooperative control of the driving source 2.

In step S35, it is determined whether the rotational speed of the driving source 2 exceeds a threshold. If the rotational speed exceeds the threshold, the process advances to step S37. If the rotational speed does not exceed the threshold, the process advances to step S36. The rotational speed of the driving source 2 may be confirmed based on information from the control unit 90, or may be confirmed based on the detection result of a sensor (not shown) configured to detect the rotational speed of the driving source 2. In step S36, it is determined whether a time-out occurs in determining whether the condition of the rotational speed of the driving source 2 is met. If a time-out occurs, it is determined that the recovery control cannot be continued, and the process advances to step S41.

In step S37, the off-gear operation is started. Here, to set the transmission gear (the transmission gear G3 in the example of FIG. 6) that cannot be disengaged in the off-gear state, the switching mechanism 16 is instructed to do disengagement, and simultaneously, the transmission torque of the clutch C1 is raised. More specifically, a disengagement control instruction is output to the actuator of the switching mechanism 16, and simultaneously, a control instruction is output to the actuator of the clutch C1 to gradually increase the connecting force such that the transmission torque from the driving source 2 to the input shaft 11 gradually increases.

In step S38, it is determined whether the off-gear operation succeeds. If the off-gear operation succeeds, the process advances to step S39. If the off-gear operation does not succeed, the process advances to step S40. This determination can be done based on the detection result of the GP sensor 76.

Figure 8A:
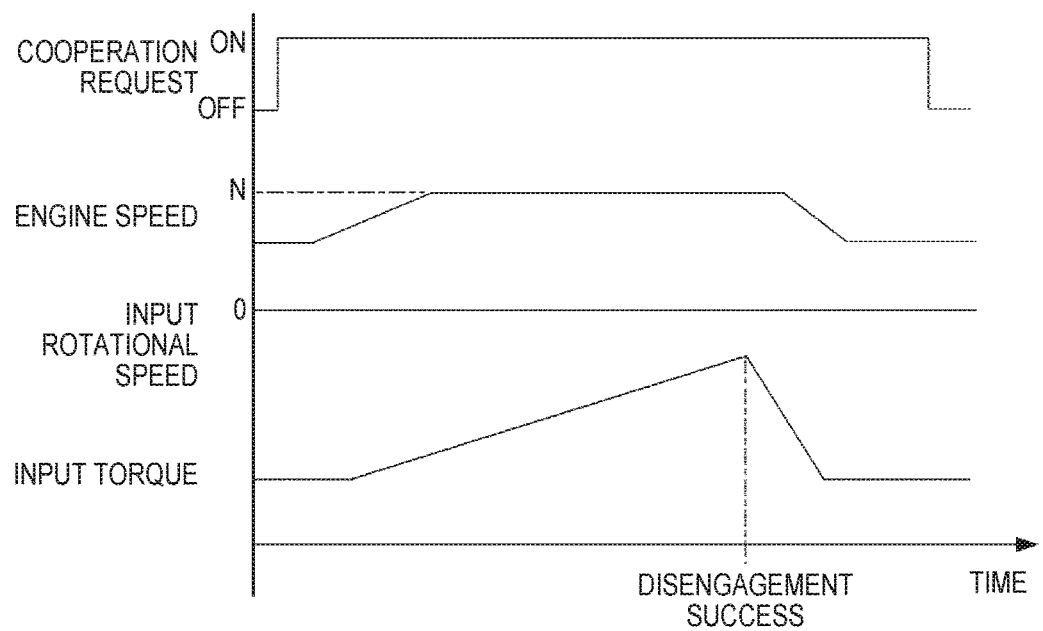
FIG. 8A is a timing chart showing a change of an input torque and the like at the time of recovery control.

FIG. 8A is a timing chart showing the control state in the processes of steps S34 to S38. When a cooperation request is transmitted from the control unit 60 to the control unit 90 (ON in FIG. 8A), the rotational speed of the driving source 2 is controlled to N that is higher than the idling engine speed. The control unit 60 increases the transmission torque of the clutch C1 from 0, and at this time, controls the degree of connection of the clutch C1 so as to maintain the rotational speed of the input shaft 11 at 0. To confirm the rotational speed of the input shaft 11, the rotational speed of the input shaft 11 can be confirmed by a sensor (not shown) configured to detect the rotational speed. If the off-gear operation succeeds, each control ends. In this embodiment, the off-gear operation can be performed by controlling the clutch C1 and the driving force of the driving source 2. No dedicated device is needed to forcibly cancel the interlock.

Referring back to FIG. 7, in step S39, recovery completion processing is performed, and the process returns to normal gear change control. The recovery completion processing of step S39 will be described later.

In step S40, it is determined whether the transmission torque of the clutch C1 reaches a defined torque. If the transmission torque reaches the defined torque, the process advances to step S41 to abandon the recovery. If the transmission torque does not reach the defined torque, the process returns to step S37 to continue the control to increase the transmission torque. The transmission torque of the clutch C1 can be calculated by the control variable to the clutch C1.

Figure 8B:
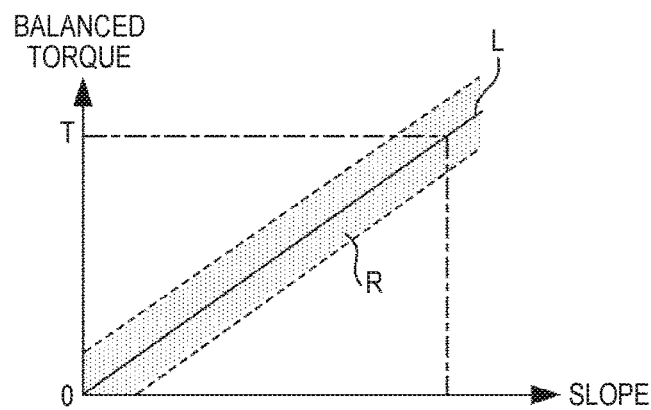
FIG. 8B is an explanatory view of a defined torque.

The defined torque can be set based on, for example, the relationship between the slope of the traveling road and the transmission torque that balances with the slope, as shown in FIG. 8B. As for the slope of the traveling road, for example, the slope of a general road is about 30% at maximum with a margin. Since the specifications of a vehicle are known, an input torque to the input shaft 11, which is necessary to bring a vehicle in a certain gear ratio to a halt on a climbing hill when the vehicle stops on the climbing hill with a certain slope, can be specified by a simulation or experiment. The input torque is the balanced torque, which is indicated by a line L proportional to the slope.

A region R sandwiched between broken lines, which is set for the balanced torque indicated by the line L in consideration of the output of the actuator of the switching mechanism 16, and the like, can be understood as the input torque that enables the off-gear operation. A defined torque T is set in correspondence with the maximum slope assumed for a general road. A case in which the off-gear operation is impossible even if the defined torque T is given can be regarded as a situation in which the off-gear operation is difficult. The defined torque T can also appropriately be set in accordance with the slope of the traveling road. However, if the defined torque T is set in correspondence with the maximum slope assumed for a general road, the slope of the traveling road need not be detected.

Referring back to FIG. 7, in step S41, a fault representing that the disengagement disable state is recorded. As for the recording, for example, the fault can be recorded in the storage unit 62 as a fault history. In an auto repair shop, a repair can be made based on the record. In step S41, using an even-numbered speed gear ratio as the subsequent gear ratio is set. In this embodiment, for example, even if the transmission gear G3 for the third speed gear ratio cannot be put off gear, forward travelling in an even-numbered speed gear ratio can be done by releasing the clutch C1. Hence, by selecting one of the even-numbered speed gear ratios for subsequent traveling, the driver can ensure a minimum movement.

<Confirmation Processing>

Figure 9:
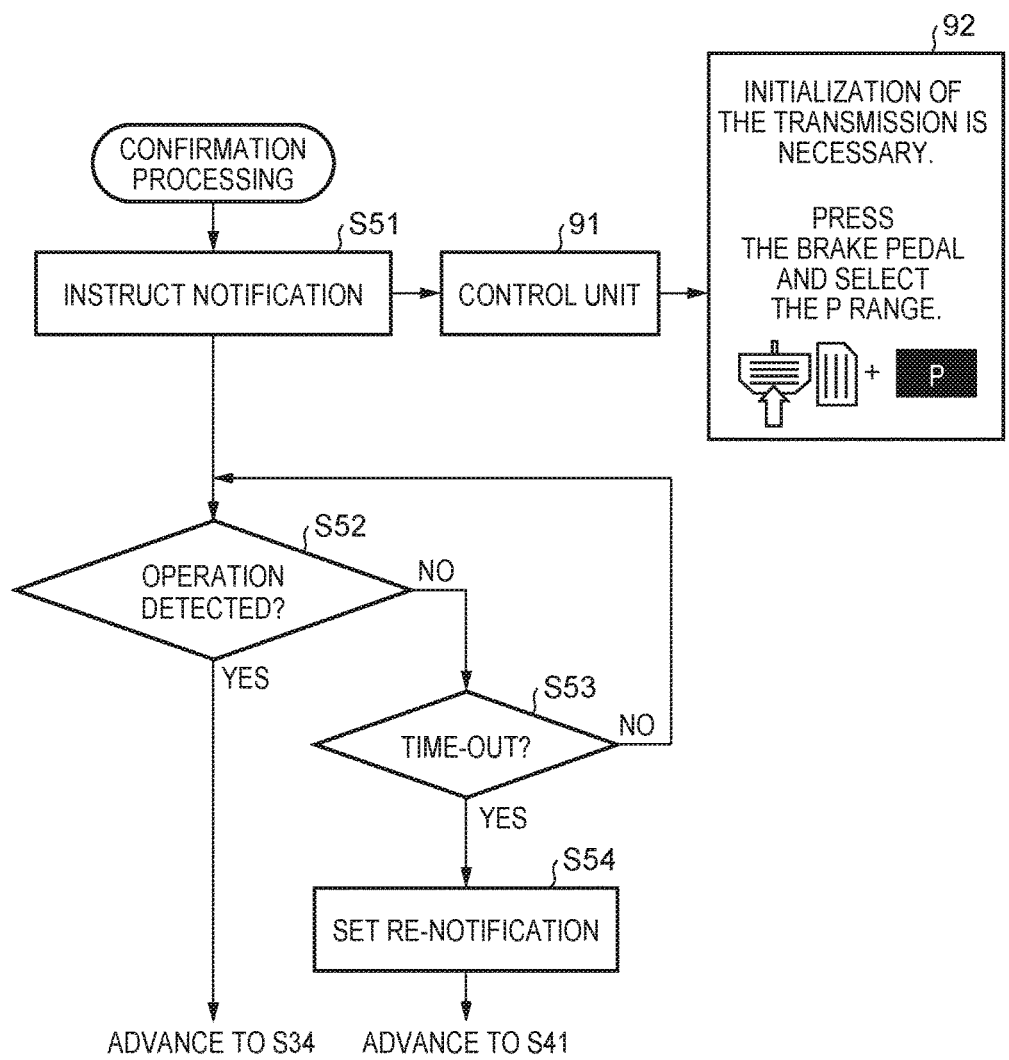
FIG. 9 is a flowchart showing an example of processing of the control unit.

An example of the confirmation processing of step S33 will be described with reference to FIG. 9. As a method of confirming an agreement on recovery control, in this embodiment, whether the driver has performed a predetermined operation is used as a criterion. In step S51, a notification execution instruction to prompt the driver to do a predetermined operation is output to the control unit 91. The control unit 91 performs processing of guiding the operation contents. This allows the driver to easily understand the operation. The example of FIG. 9 shows a case in which the operation contents are displayed on the display device 92. At this time, the audio output device 93 may also guide the operation contents by speech or output a beep to call an attention.

In this embodiment, the predetermined operation includes the foot brake operation and selection of the parking range. When the parking range is selected, the parking lock device 47 operates to lock the countershaft 40 on the transmission case. Note that in a strict sense, the parking range is not established because there exist a transmission gear in gear.

The predetermined operation may be one operation. However, when a plurality of operations are combined, as in this embodiment, the agreement of the driver can more correctly be confirmed, and an error in the agreement determination caused by accidental operation establishment can be prevented. In addition, if all the operations are operations concerning the stop of the vehicle, the recovery operation can be performed in a state in which the stop of the vehicle is maintained. Hence, the safety can further be improved.

The display device 92 displays a message representing the necessity of initialization of the automatic transmission 1 and also displays a schematic diagram and characters to prompt the driver to do the foot brake operation and select the parking range.

In step S52, it is determined whether the notified operations are performed, that is, the driver agrees to the recovery operation. The presence/absence of the above-described operations can be determined based on the detection results of the brake sensor 75 and the SP sensor 74. If both the operations are detected, the process advances to step S34 (FIG. 7) to perform recovery control. If both the operations are not detected, the process advances to step S53.

In step S53, it is determined whether a predetermined time has elapsed from the start of the notification. If a time-out occurs, it is determined that the driver does not agree to the recovery operation, and the process advances to step S54. In step S54, a setting is done to make a re-notification by the process of step S51. In this embodiment, as described concerning step S41, even if the disengagement of the switching mechanism 16 remains impossible, forward travelling can be done in an even-numbered speed gear ratio.

When the recovery operation is performed, and the switching mechanism 16 is disengaged, all gear ratios can be used. By the setting of step S54, the notification to prompt the driver to do the predetermined operation described concerning step S51 is made if the vehicle travels without the agreement to the recovery operation. This notification may be made only when the vehicle is at a stop, or may be done always or periodically irrespective of whether the vehicle is at a stop. After the process of step S54, the process advances to step S41 in FIG. 7.

<Recovery Completion Processing>

Figure 10:
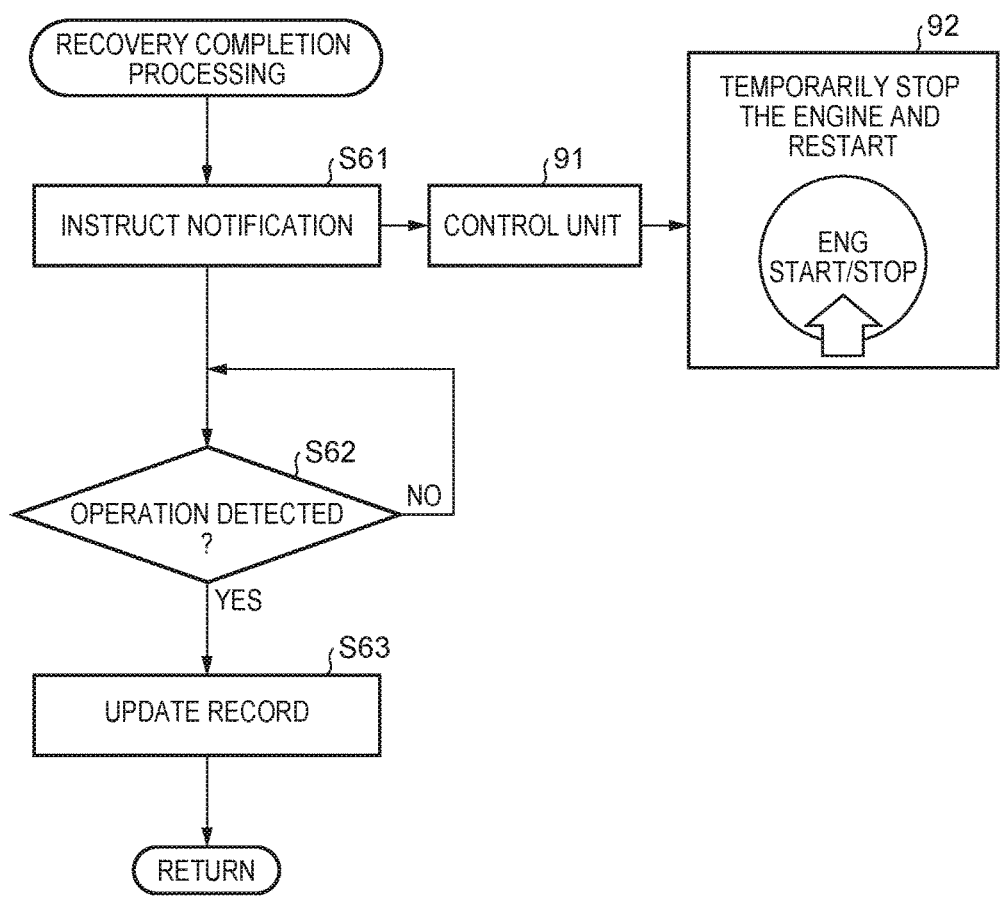
FIG. 10 is a flowchart showing an example of processing of the control unit.

An example of the recovery completion processing of step S39 will be described with reference to FIG. 10. If the switching mechanism 16 is successfully disengaged, the process can directly return to normal processing. However, complete recovery can be confirmed by temporarily resetting the function of the vehicle. In this embodiment, a notification to prompt the driver to do a restart operation of the vehicle is made.

In step S61, a notification execution instruction to prompt the driver to do a restart operation is output to the control unit 91. The example of FIG. 10 shows a case in which the operation contents are displayed on the display device 92. At this time, the audio output device 93 may also guide the operation contents by speech or output a beep to call an attention.

In this embodiment, the driving source 2 is an internal combustion engine. Hence, the restart of the vehicle is the restart of the internal combustion engine. In the display example of the display device 92, the driver is instructed to do operations (stop and restart) on the start button of the internal combustion engine. In a general vehicle, when the internal combustion engine is started, self-inspection of various functions is also performed. Hence, by restarting the internal combustion engine, the function of the power train and the like can be confirmed, and the recovery of the switching mechanism 16 can more reliably be confirmed.

In step S62, it is determined whether the notified operation is performed. If the operation is performed, the process advances to step S63. Whether the notified operation is performed can be determined based on, for example, information from the control unit 90. In step S63, the recovery from the off-gear disable state is recorded in the storage unit 62, and the process returns to normal gear change control.

Other Embodiments

In the above embodiment, using an example of an off-gear failure of the switching mechanism 16, recovery control processing and driver's agreement confirmation processing concerning the recovery operation have been exemplified. These processes can be applied not only to the off-gear failure but also to the loss of various functions of the vehicle, that is, the loss of automatically recoverable functions of the vehicle. The functions to which the processes are applicable can include functions unassociated with the traveling of the vehicle as well as functions associated with the traveling of the vehicle. The functions associated with the traveling of the vehicle can include not only the functions of mechanical elements such as the internal combustion engine, motor, transmission, and braking device but also functions associated with information processing such as the program execution function of the ECUs and the communication function between the ECUs. The functions unassociated with the traveling of the vehicle can include functions associated with information processing of the navigation system and the audio system. In any case, when the recovery operation is started after the driver agrees, a lost function can be recovered in accordance with the situation of the vehicle.

SUMMARY OF EMBODIMENT

1. An automatic transmission (for example, 1) according to the embodiment comprises:

a first transmission mechanism (for example, 10) to which a driving force of a driving source (for example, 2) is input through a first clutch (for example, C1) and which is configured to switch driving force transmission paths to an output member (for example, 41) to establish a first set of gear ratios (for example, odd-numbered speed gear ratios);

a second transmission mechanism (for example, 20) to which the driving force of the driving source is input through a second clutch (for example, C2) and which is configured to switch driving force transmission paths to the output member to establish a second set of gear ratios (for example, even-numbered speed gear ratios); and a control unit (for example, 60), wherein a one-way clutch (for example, OC) is provided in a driving force transmission path that establishes a first certain gear ratio in the first set, the first transmission mechanism comprises:

an input shaft (for example, 11) to which the driving force of the driving source is input through the first clutch;

a first transmission gear (for example, G1) provided on the input shaft and configured to establish the first certain gear ratio;

a plurality of second transmission gears (for example, G3, G5, G7, G9) provided on the input shaft and configured to establish remaining gear ratios in the first set; and a switching mechanism (for example, 16) configured to perform engagement and disengagement between the input shaft and the plurality of second transmission gears, a driving transmission direction of the one-way clutch is set such that a rotation inputted from a wheel side to the output member in a predetermined rotational direction is transmitted to the input shaft, the predetermined rotational direction corresponding to a backward movement of a vehicle, and when disengagement by the switching mechanism is impossible, the control unit can execute recovery control (for example, FIG. 7) to enable the disengagement on condition that a driver performs a predetermined operation (for example, S33, FIG. 9).

According to the embodiment, a lost function, particularly, the function of the switching mechanism can be recovered in accordance with the situation of the vehicle.

2. In the automatic transmission (for example, 1) according to the embodiment, the vehicle on which the automatic transmission is mounted comprises a notification unit (for example, 92, 93) configured to make a notification to prompt the driver to perform the predetermined operation, and in the case in which the disengagement by the switching mechanism is impossible, the control unit outputs an instruction to cause the notification unit to execute the notification (for example, S51).

According to the embodiment, the driver can easily understand a necessary operation.

3. In the automatic transmission (for example, 1) according to the embodiment, when the disengagement by the switching mechanism is impossible, the control unit selects one of the gear ratios in the second set if the vehicle travels (for example, S41).

According to the embodiment, even if the interlock cannot be canceled, a minimum movement can be ensured.

4. In the automatic transmission (for example, 1) according to the embodiment, the switching mechanism comprises:

a dog clutch; and an actuator configured to operate the dog clutch.

According to the embodiment, it is possible to forcibly cancel the interlock caused by a jam in the mechanism after the driver agrees.

5. In the automatic transmission (for example, 1) according to the embodiment, the gear ratios in the first set are odd-numbered speed gear ratios, and the gear ratios in the second set are even-numbered speed gear ratios.

According to the embodiment, the interlock generated in an odd-numbered speed gear ratio can forcibly be canceled. Additionally, if the interlock cannot be canceled, the vehicle can start in the second speed gear ratio, and traveling performance can be ensured.

6. In the automatic transmission (for example, 1) according to the embodiment, the first certain gear ratio is a $1^{st}$-speed gear ratio.

According to the embodiment, the cost can be reduced by employing the one-way clutch.

7. The automatic transmission (for example, 1) according to the embodiment further comprises a countershaft provided in parallel to the input shaft, wherein the output member is provided on the countershaft, and a gear configured to mesh with the first transmission gear is provided on the countershaft through the one-way clutch.

According to the embodiment, the interlock generated by a torque circulation between the input shaft and the countershaft can forcibly be canceled after the driver agrees.

8. A control method, according to the embodiment, of an automatic transmission (for example, 1) which comprises:

a first transmission mechanism to which a driving force of a driving source is input through a first clutch and which is configured to switch driving force transmission paths to an output member to establish a first set of gear ratios; and a second transmission mechanism to which the driving force of the driving source is input through a second clutch and which is configured to switch driving force transmission paths to the output member to establish a second set of gear ratios, wherein a one-way clutch is provided in a driving force transmission path that establishes a first certain gear ratio in the first set, the first transmission mechanism comprises:

an input shaft to which the driving force of the driving source is input through the first clutch;

a first transmission gear provided on the input shaft and configured to establish the first certain gear ratio;

a plurality of second transmission gears provided on the input shaft and configured to establish remaining gear ratio in the first set; and a switching mechanism configured to perform engagement and disengagement between the input shaft and the plurality of second transmission gears, and a driving transmission direction of the one-way clutch is set such that a rotation inputted from a wheel side to the output member in a predetermined rotational direction is transmitted to the input shaft, the predetermined rotational direction corresponding to a backward movement of a vehicle, the control method comprises:

determining whether disengagement by the switching mechanism is impossible (for example, S31); and upon determining that the disengagement is impossible, executing recovery control (for example, FIG. 7) to enable the disengagement on condition that a driver performs a predetermined operation (for example, S33).

According to the embodiment, a lost function, particularly, the function of the switching mechanism can be recovered in accordance with the situation of the vehicle.

9. A vehicle (for example, VH) according to the embodiment comprises:

a notification unit (for example, 92, 93) configured to make a notification to prompt a driver to perform a predetermined operation in a case in which a predetermined function of the vehicle (for example, VH) is lost; and a control unit (for example, 60) configured to start a recovery operation of the predetermined function on condition that the predetermined operation is performed.

According to the embodiment, a lost function can be recovered in accordance with the situation of the vehicle.

10. In the vehicle (for example, VH) according to the embodiment, the predetermined function is associated with traveling of the vehicle (for example, the gear change function of the automatic transmission 1).

According to the embodiment, concerning a function associated with traveling of the vehicle and required to have higher safety, the recovery operation can be started after the driver agrees.

11. In the vehicle (for example, VH) according to the embodiment, the predetermined operation is associated with a stop of the vehicle (for example, brake ON and P range selection).

According to the embodiment, the recovery operation can be performed in a safer state.

12. In the vehicle (for example, VH) according to the embodiment, the predetermined operation is a combination of a plurality of operations (for example, brake ON and P range selection).

According to the embodiment, an error in determining the driver's intention can be prevented.

13. In the vehicle (for example, VH) according to the embodiment, the notification unit includes at least a display device (for example, 92) arranged to be visible to the driver.

According to the embodiment, it is possible to guide a necessary operation for the driver such that he/she can easily visually recognize it.

14. In the vehicle (for example, VH) according to the embodiment, if the driver makes the vehicle travel without performing the predetermined operation, the notification unit makes the notification to prompt the driver to perform the predetermined operation again (for example, S54).

According to the embodiment, it is possible to prompt the driver to perform the recovery operation.

15. In the vehicle (for example, VH) according to the embodiment, if the recovery operation of the predetermined function is completed, the notification unit makes a notification to prompt the driver to perform a restart operation of the vehicle (for example, S51).

According to the embodiment, it is possible to prompt the driver to reset the whole vehicle after the recovery.

16. A control method of a vehicle (for example, VH) according to the embodiment comprises:
  making a notification to prompt a driver to perform a predetermined operation in a case in which a predetermined function of the vehicle is lost (for example, S51); and
  starting a recovery operation of the function on condition that the predetermined operation is performed (for example, FIG. 7).

According to the embodiment, a lost function can be recovered in accordance with the situation of the vehicle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2016-037931, filed Feb. 29, 2016, which is hereby incorporated by reference herein in its entirety.

What is claimed is:

1. An automatic transmission comprising:
  a first transmission mechanism to which a driving force of a driving source is input through a first clutch and which is configured to switch driving force transmission paths to an output member to establish a first set of gear ratios;
  a second transmission mechanism to which the driving force of the driving source is input through a second clutch and which is configured to switch driving force transmission paths to the output member to establish a second set of gear ratios; and
  a control unit,
  wherein a one-way clutch is provided in a driving force transmission path that establishes a first certain gear ratio in the first set,
  the first transmission mechanism comprises:
  an input shaft to which the driving force of the driving source is input through the first clutch;
  a first transmission gear provided on the input shaft and configured to establish the first certain gear ratio;
  a plurality of second transmission gears provided on the input shaft and configured to establish remaining gear ratios in the first set; and
  a switching mechanism configured to perform engagement and disengagement between the input shaft and the plurality of second transmission gears,
  a driving transmission direction of the one-way clutch is set such that a rotation inputted from a wheel side to the output member in a predetermined rotational direction is transmitted to the input shaft, the predetermined rotational direction corresponding to a backward movement of a vehicle, and
  when disengagement by the switching mechanism is impossible, the control unit can execute recovery control to enable the disengagement on condition that a driver performs a predetermined operation.

2. The transmission according to claim 1, wherein the vehicle on which the automatic transmission is mounted comprises a notification unit configured to make a notification to prompt the driver to perform the predetermined operation, and
  in the case in which the disengagement by the switching mechanism is impossible, the control unit outputs an instruction to cause the notification unit to execute the notification.

3. The transmission according to claim 1, wherein when the disengagement by the switching mechanism is impossible, the control unit selects one of the gear ratios in the second set if the vehicle travels.

4. The transmission according to claim 1, wherein the switching mechanism comprises:
  a dog clutch; and
  an actuator configured to operate the dog clutch.

5. The transmission according to claim 1, wherein the gear stages of the first set are odd-numbered speed gear ratios, and
  the gear stages of the second set are even-numbered speed gear ratios.

6. The transmission according to claim 1, wherein the first certain gear ratio is a $1^{st}$-speed gear ratio.

7. The transmission according to claim 1, further comprising a countershaft provided in parallel to the input shaft,
  wherein the output member is provided on the countershaft, and
  a gear configured to mesh with the first transmission gear is provided on the countershaft through the one-way clutch.

8. A control method of an automatic transmission which comprises:
  a first transmission mechanism to which a driving force of a driving source is input through a first clutch and which is configured to switch driving force transmission paths to an output member to establish a first set of gear ratios; and
  a second transmission mechanism to which the driving force of the driving source is input through a second clutch and which is configured to switch driving force transmission paths to the output member to establish a second set of gear ratios,
  a one-way clutch is provided in the driving force transmission path that establishes a first certain gear ratio in the first set,
  wherein the first transmission mechanism comprises:
  an input shaft to which the driving force of the driving source is input through the first clutch;
  a first transmission gear provided on the input shaft and configured to establish the first certain gear ratio;
  a plurality of second transmission gears provided on the input shaft and configured to establish remaining gear stages in the first set; and
  a switching mechanism configured to perform engagement and disengagement between the input shaft and the plurality of second transmission gears, and
  a driving transmission direction of the one-way clutch is set such that a rotation inputted from a wheel side to the output member in a predetermined rotational direction is transmitted to the input shaft, the predetermined rotational direction corresponding to a backward movement of a vehicle,
  the control method comprising:
  determining whether disengagement by the switching mechanism is impossible; and
  upon determining that the disengagement is impossible, executing recovery control to enable the disengagement on condition that a driver performs a predetermined operation.

* * * * *